United States Patent [19]

Marshall et al.

[11] Patent Number: 4,672,636
[45] Date of Patent: Jun. 9, 1987

[54] AFC CIRCUIT FOR DIRECT MODULATION FM DATA RECEIVERS

[75] Inventors: Christopher B. Marshall, Horley; John F. Wilson, Great Shelford; Robert Nettleship, deceased, Oakington, all of England, by Demetra D. Nettleship, executor

[73] Assignee: U.S. Philips Corporation, New York, N.Y.

[21] Appl. No.: 729,011

[22] Filed: Apr. 30, 1985

[30] Foreign Application Priority Data

Apr. 30, 1984 [GB] United Kingdom ............... 8411037

[51] Int. Cl.[4] ............................................. H04L 27/14
[52] U.S. Cl. ........................................ 375/88; 375/97; 329/122; 455/208; 455/258
[58] Field of Search ...................... 375/88, 90, 91, 97, 375/45, 47; 328/122, 50; 455/208, 212

[56] References Cited

U.S. PATENT DOCUMENTS

| 4,426,735 | 1/1984 | Kasperkovitz | 455/208 |
| 4,509,205 | 4/1985 | Kasperkovitz | 455/212 |
| 4,523,324 | 6/1985 | Marshall | 375/91 |
| 4,547,902 | 10/1985 | Kasperkovitz | 455/208 |

FOREIGN PATENT DOCUMENTS 2109201  5/1983  United Kingdom ................ 375/88

Primary Examiner—Benedict V. Safourek
Assistant Examiner—M. Huseman
Attorney, Agent, or Firm—David R. Treacy

[57] ABSTRACT

An FM data receiver of the offset type, in which the local oscillator frequency is located between the two frequency-shift-keyed signalling frequencies. To counter the effects of drift in the local oscillator, a simple AFC system mixes the signalling tone signals with delayed signals to provide a frequency control signal.

19 Claims, 23 Drawing Figures

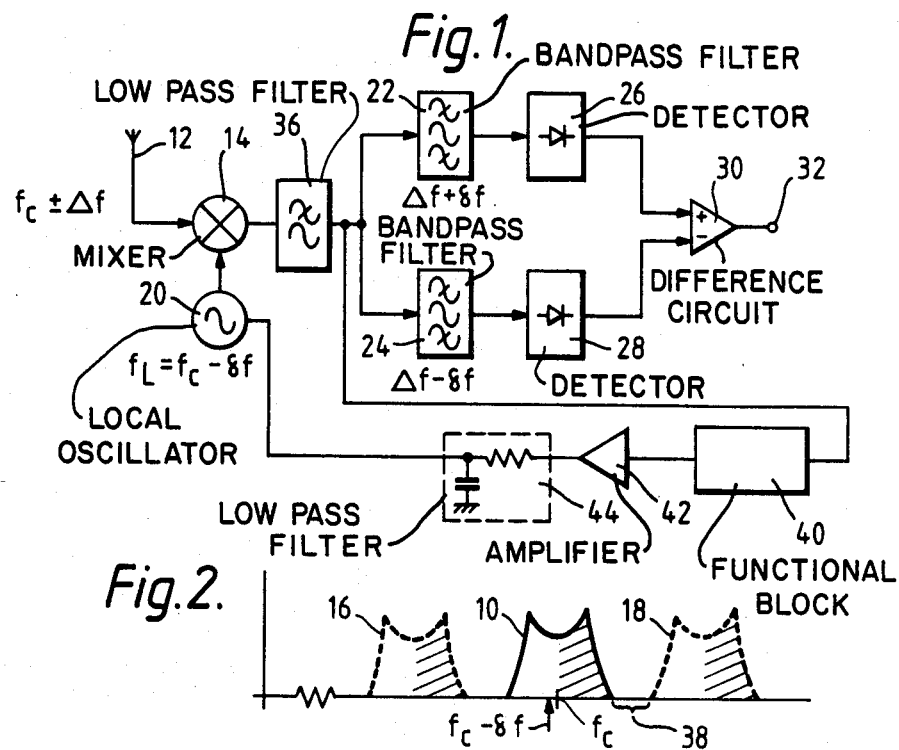
Fig. 1.
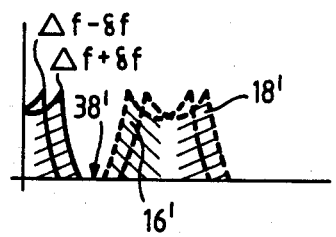
Fig. 2.
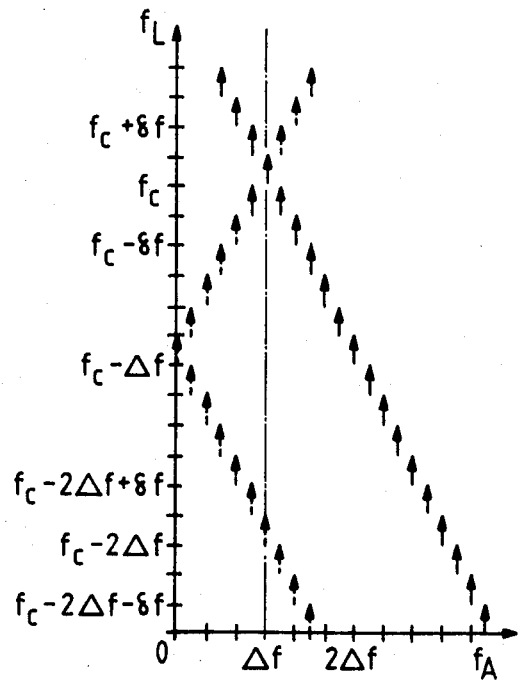
Fig. 3.
Fig. 4.

AFC CIRCUIT FOR DIRECT MODULATION FM DATA RECEIVERS

BACKGROUND OF THE INVENTION

1. Field of the Invention

The present invention relates to improvements in or relating to direct modulation FM data receivers in which a local oscillator frequency is located between two signalling frequencies thereby deliberately folding the transmitted spectrum about d.c. More particularly the present invention relates to automatic frequency control in such receivers which may be used in receiving and demodulating frequency shift keyed (F.S.K) signals as may be used in digital paging in which the bit rate, for example 512 bits/second is lower than the deviation ($\Delta f$), for example 4.5 kHz.

A direct modulation FM data receiver in which a local oscillator frequency is located between two signalling frequencies is disclosed in British Patent Specification No. 2109201A, to which U.S. Pat. No. 4,523,324 corresponds, details of which are incorporated herein by way of reference. This known receiver comprises a mixer having a first input for receiving a directly modulated FM signal with a given deviation ($\Delta f$), and a second input for a local oscillator signal having a frequency within the signal channel but offset from the input signal carrier frequency by an amount or offset ($\delta f$) which is normally selected to be less than the deviation; and a demodulator for distinguishing between the upper and lower signalling tones ($\Delta f + \delta f$) and ($\Delta f - \delta f$) which are generated in the mixer, and deriving an output data signal therefrom.

An important consideration in such receivers which for convenience will be referred to as "offset receivers" is frequency stability of the carrier frequency and the local oscillator frequency. Ideally there should be a constant frequency difference (offset) between them in order to maintain a constant frequency spacing between the low and high frequency tones. For example with a deviation or center frequency of 4.5 kHz and an offset of 2.25 kHz then the lower frequency tone will be 2.25 kHz and the higher frequency tone will be 6.75 kHz. If the local oscillator frequency should drift further from the transmitter carrier by, for example, 2 kHz then the effect will be to increase the frequency separation between the tones so that their respective frequencies are 250 Hz and 8.75 kHz. Consequently the frequency discriminator would have to work to the ends of a range from d.c. to 9 kHz which is not desirable because the performance of the discriminator drops off at tone frequencies below the bit rate.

Alternatively if the local oscillator frequency should drift closer to the carrier frequency then the frequency separation between the tones diminishes, making reliable demodulation of the tones more difficult. When the carrier and local oscillator frequencies are the same then other receiver architectures have to be used.

Mistuning of up to 2 kHz in either direction is possible because local oscillator frequency drifts of up to 1 kHz at VHF can be expected; and also in some transmission systems transmitter offsets of up to 1 kHz are introduced.

2. Description of the Prior Art

Accordingly there is a need for an automatic frequency control system in such receivers. British Patent Specification No. 2109201A discloses two alternative AFC systems. Each has its own disadvantages. In the case of the simpler AFC system in which a low pass filter is coupled between the receiver output and a control input of a local oscillator, it was found that the trimming of two bandpass filters used in the demodulating means was critical to avoid spurious locking positions. The second AFC system required providing another mixer and local oscillator coupled to the output of the first mentioned mixer, as well as a frequency discriminator whose output is coupled to a control input of the local oscillator. Although this second AFC system has been shown to work it is nevertheless somewhat complicated.

An AFC system for an FM receiver is also known from British Patent Specification No. 2059702A. However, unlike the offset receiver to which the present invention relates, the AFC system tunes a local oscillator whose frequency remains to one side of the transmitted signal; that is, $\delta f > \Delta f$. In this known receiver a conventional discriminator can be used to generate the appropriate AFC transfer function which is linear. By increasing the loop gain and lengthening the time-constant of the AFC loop, to prevent the local oscillator following the modulation, a predetermined offset can be maintained between the local oscillator and the transmitted carrier. This can only be achieved as long as the transmitted signal remains on the correct side of the local oscillator, the nominal offset from which must be greater than the deviation. Such an arrangement cannot be used when the offset is smaller than the deviation because a non-linear discriminator transfer characteristic must then be used. The realization of such a non-linear discriminator transfer characteristic cannot be done very simply.

SUMMARY OF THE INVENTION

Accordingly it is an object to provide a simple and effective AFC system for an offset receiver.

According to the present invention, in a direct modulation FM data receiver as described in the Field of the Invention above, the AFC system includes a sub-circuit coupled to the output of the mixer, having a frequency-voltage transfer function which is non-linear when the receiver is tuned to the nominal frequency offset within the region occupied by the channel data signals. The sub-circuit is designed so that in operation it produces an output voltage of such a sign over the relevant frequency range as to tune the local oscillator frequency on to the desired offset frequency.

Conveniently the non-linear transfer function may be peaked when the receiver is tuned to the nominal frequency offset.

Compared with the AFC systems, disclosed in British Patent Specification No. 2109201A, the system incorporated into the receiver made in accordance with the present invention is simple in its construction and operation. As it can operate with both high and low frequency tones, the AFC system is substantially independent of the actual data signal being received. Further, one is able to have the other advantages of an AFC system of ensuring a proper separation of the high and low frequency tones so that the discriminator performance is optimum. Additionally in the case of having a transmission system which does not have deliberate offsets, then one can use narrower channels, say 12.5 kHz, rather than the present channel width of 25 kHz.

In one embodiment of the present invention the sub-circuit in the AFC system has a substantially symmetrical triangular voltage-frequency transfer function with a vertex of the transfer function occurring at the deviation frequency ($\Delta f$) and an output of the sub-circuit is coupled to a frequency control input of the local oscillator. The vertex of the substantially triangular voltage-frequency transfer function may occur at a maximum or a minimum voltage. Such a transfer function enables the correct AFC output to be obtained for both of said signalling tones.

The AFC system in the receiver made in accordance with the present invention may be implemented in an analogue or digital form. An analogue implementation of the sub-circuit having a substantially triangular transfer function, with a vertex at a maximum voltage, comprises a multiplier having one input coupled to the output of the mixer and another input connected to an output of a delay device whose input is coupled to the mixer. A smoothing circuit is connected to the output of the multiplier to remove the high frequency product term, also to define the time constant of the AFC system.

A digital implementation of the AFC circuit comprises coupling a voltage limiter circuit to the output of the mixer, and coupling the output of the voltage limiter circuit and a delayed version thereof to respective inputs of an Exclusive-OR circuit. An output of the Exclusive-OR circuit is coupled to a smoothing circuit which supplies the control voltage to the local oscillator. The means for delaying output of the voltage limiter circuit may comprise a shift register having at least 8 stages. By having at least 8 stages in the shift register then a high clock frequency can be used which will avoid problems caused by the input frequency and the clock frequency being harmonically related. While it would be advantageous to use a larger shift register and a higher clock frequency there are penalties in the form of cost of the shift register and a higher power consumption of the clock generator.

In another embodiment of the present invention, the AFC system further comprises a low pass filter which provides the loop filter function and also combines the AFC signals resulting from the reception of the two signalling frequencies. The transfer function is derived from the average of the outputs produced by the two tones and takes advantage of assuming that in signalling there is a substantially equal number of "1"s and "0"s. The AFC system in this embodiment is able to tune the local oscillator over an extended range compared to those embodiments in which the AFC system operates on one of the tones.

The present invention will be described, by way of example, with reference to the accompanying drawing.

BRIEF DESCRIPTION OF THE DRAWING

FIG. 1 is a simplified block schematic circuit diagram of a direct modulation FM data receiver made in accordance with the present invention, FIG. 2 illustrates the frequency spectrum of an input signal, FIG. 3 illustrates the frequency spectrum of the signals at the output of the mixer shown in FIG. 1, FIG. 4 is a diagram explaining the shifts in the signal tones relative to change in local oscillator frequency $f_L$.

DESCRIPTION OF THE PREFERRED EMBODIMENTS

Figure 5:
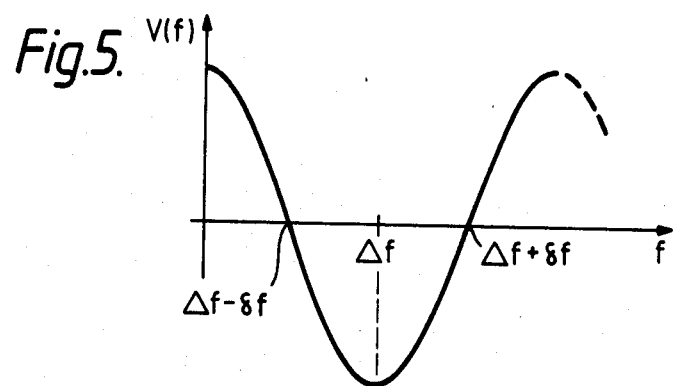
FIG. 5 is a graph showing the transfer function of the functional block 40 in FIG. 1.

In the drawings the same reference numerals have been used to indicate the corresponding features.

Referring initially to FIGS. 1 to 3 of the drawings, a direct modulation FM input signal 10 (FIG. 2) with carrier $f_c$ and deviation $\Delta f$, that is at a frequency $f_c \pm \Delta f$, is received by an antenna 12 and applied to one input of a mixer 14. Besides the desired signal, also adjacent channel signals 16, 18, shown in broken lines (FIG. 2), will be received and passed to the mixer 14. The adjacent channel signals 16, 18 are separated from the signal 10 by guard bands 38. A local oscillator 20 having a frequency $f_L$ between the two signalling frequencies $f_c \pm \Delta f$ is coupled to a second input of the mixer 14. In the present embodiment the local oscillator frequency is $f_L = f_c - \delta f$, which is within the signal channel but which is offset a small amount ($\delta f$) from the carrier frequency ($f_c$). Although not described in detail hereinafter the local oscillator could have a frequency ($f_c + \delta f$). The mixing of these input and local oscillator signals folds the spectrum about d.c. as shown in FIG. 3 so that the output of the mixer 14 includes the signalling tones $\Delta f + \delta f$ and $\Delta f - \delta f$, and the frequency shifted adjacent channel sgnals 16', 18'. From an examination of the output spectrum of the mixer, FIG. 3, it will be observed that the two peaks at the signalling tones $\Delta f + \delta F$ and $\Delta f - \delta F$ are separated by $2\delta f$. As the signalling tones differ in frequency, they can now be distinguished from each other by a suitable discriminator.

In the illustrated embodiment this is done by separating the tones from each other and from any low frequency noise by bandpass filters 22, 24, respectively, having a bandwidth of the order of the bit rate, say 500 Hz for a bit rate of 512 bits/second. The output of each bandpass filter 22, 24 is applied to a respective amplitude (or envelope) detector 26, 28. In order to recover the data signal the outputs of the amplitude detectors 26, 28 are compared in a difference circuit 30 to provide a data output on a terminal 32.

The offset $\delta f$ is less than the deviation $\Delta f$ in order to avoid too big a separation between the peaks and undue erosion of the guard band between the adjacent channels. If the offset $\delta f$ is large enough to place the local oscillator frequency outside the signalling channel so that no folding of the spectrum occurs, then a low I.F. conventional superhet results.

In order to improve the adjacent channel selectivity, the frequency shifted adjacent channel signals 16', 1840 are attenuated by connecting a low pass or a bandpass filter 36 between the output of the mixer 14 and the bandpass filters 22, 24. In fact the filter 36 may be essential in situations where the discriminator does not provide filtering or where there is narrow channel spacing, because by using the offset local oscillator signal $f_c - \delta f$ (or $f_c + \delta f$) the guard band 38' (FIG. 3) between the signals is narrower than the frequency band 38 (FIG. 2) between adjacent channels of the received signal at the antenna 12. As both the adjacent signal channels 16' and 18' are higher in frequency at the mixer output than the wanted signalling tones, then the channels 16' and 18' can be removed by a low pass filter (unlike a superheterodyne receiving system where the adjacent channels normally lie on either side of the wanted signal which can then only be selected using a bandpass filter). An advantage of implementing the filter 36 as a bandpass filter rather than as a low pass filter is that its characteristic rolls off more sharply and therefore is more selective and can remove some of the low frequency noise.

It is necessary to stabilise the frequency of the local oscillator 20 in order to help produce the signalling tones at the desired frequencies.

Referring to FIG. 4 the ordinate represents the local oscillator frequency $f_L$ and the abscissa the audio frequency $f_A$. The upstanding arrows in full lines represent signals initiated by the transmission of $f_c + \Delta f$ and those represented by the broken lines are signals initiated by the transmission of $f_c - \Delta f$. As will be observed the drawing illustrates the local oscillator frequency $f_L$ drifting relative to the carrier frequency $f_c$. The tones $\Delta f + \delta f$ and $\Delta f - \delta f$ move symmetrically above the "direct conversion point", that is when $f_L = f_c$, but below the local oscillator frequency of $f_c - \Delta f$ and above the local oscillator frequency of $f_c + \Delta f$ (not shown) then the signals track each other with a constant spacing of $2\Delta f$ as in a conventional superhet receiver.

Taking as an example a case when the local oscillator frequency is $f_c - \delta f$, then the audio tones are disposed on either side of $\Delta f$ by $\pm \delta f$. However if the local oscillator frequency drifts towards $f_c$ then the separation between the tones diminishes and eventually disappears at $f_L = f_c$. The opposite effect occurs if the local oscillator frequency drifts towards $f_c - \Delta f$; then the separation of the tones increases so that they are separated by $2\Delta f$.

The movement of one or both of these tones relative to a reference audio signal such as $\Delta f$, when $f_L = f_c$, can be used to provide an AFC signal for the local oscillator.

Reverting to FIG. 1, the feedback loop includes a functional block or sub-circuit 40 whose input is connected to the output of the channel filter 36 and whose output is connected to an amplifier 42, the output of which is filtered in a low pass filter 44 before being connected to the local oscillator 20. The general requirement of the functional block 40 is that when the receiver is tuned to the nominal frequency offset, the discriminator transfer function for the offset receiver AFC must be non-linear; for example, peaked. Thus the functional block 40 should provide the correct output sign over the relevant frequency ranges to urge the local oscillator frequency in a direction to tune the receiver properly.

FIG. 5 shows the transfer function of the functional block 40 and illustrates how the D.C. voltage developed at the output depends on the frequency of a single tone input. In this figure the ordinate is the feedback voltage $V(f)$, the abscissa is frequency, and the curve has the general form of $V(f) \lambda \cos \theta(f)$. The transfer characteristic is of generally inverted voltage V form with the vertex occuring at a frequency $\Delta f$. If the feedback voltage $V(f)$ is taken as zero when the receiver is correctly tuned, this zero voltage will be produced at the frequency $\Delta f - \delta f$ in the case of a "1" tone and $\Delta f + \delta f$ in the case of a "0" tone. Thus the feedback voltage is unchanged by the relative number of 1's and 0's in the data being received. Further, the slopes of the characteristic for any given value of $\delta f$ are equal in magnitude but opposite in sign, so the relative number of 1's and 0's does not affect the correction voltage.

If the local oscillator frequency drifts so that the two tones move from $\Delta f - \delta f$ and $\Delta f + \delta f$ towards each other, then the feedback voltage $V(f)$ goes negative; and conversely, when the local oscillator frequency changes to cause the tones which are lower than $\Delta f - \delta f$ and higher than $\Delta f + \delta f$ to move further apart in frequency relative to each other, then the feedback voltage $V(f)$ goes positive. The transfer characteristic shown in FIG. 5 has the following criteria for a local oscillator tuned below the carrier:

| For input $f < \Delta f - \delta f$ | then output $V(f) > 0$ |
|---|---|
| $f = \Delta f - \delta f$ | $V(f) = 0$ |
| $\Delta f - \delta f < f < \Delta f + \delta f$ | $V(f) < 0$ |
| $f = \Delta f + \delta f$ | $V(f) = 0$ |
| $\Delta f + \delta f < f < f_{max}$ | $V(f) > 0$ |

Figure 7:
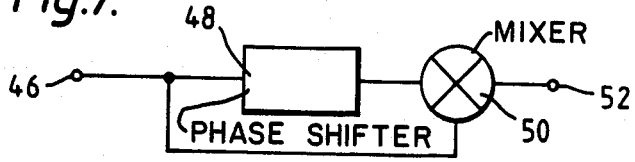
FIG. 7 is a block schematic diagram of an embodiment of the functional block 40 shown in FIG. 1 which provides an analogue transfer function.

The criteria set forth above can be met with a functional block comprising an analogue circuit as shown in FIG. 7. The analogue circuit comprises an input 46 which is connected to a phase shifter 48 and to one input of a mixer 50. A second input of the mixer 50 is coupled to the output of the phase shifter 48. An output 52 of the mixer 50 is connected to the amplifier 42 (FIG. 1). Disregarding multiples of $2\pi$ the phase shifter 48 has criteria corresponding to those above, that is,

| For input $f < \Delta f - \delta f$ | then phase shift $\theta(f)$ $-\pi/2 < \theta(f) < \pi/2$ |
|---|---|
| $f = \Delta f - \delta f$ | $\theta(f) = \pi/2$ |
| $\Delta f - \delta f < f < \Delta f + \delta f$ | $\pi/2 < \theta(f) < 3\pi/2$ |
| $f = \Delta f + \delta f$ | $\theta(f) = 3\pi/2$ |
| $\Delta f + \delta f < f < f_{max}$ | $3\pi/2 < \theta(f) < 5\pi/2$ |

In an embodiment of such a functional block, the phase shifter 48 comprised three cascaded first order sections and it was found to act correctly down to signal levels as low as the minumum that could be demodulated when tuned.

Figure 6:
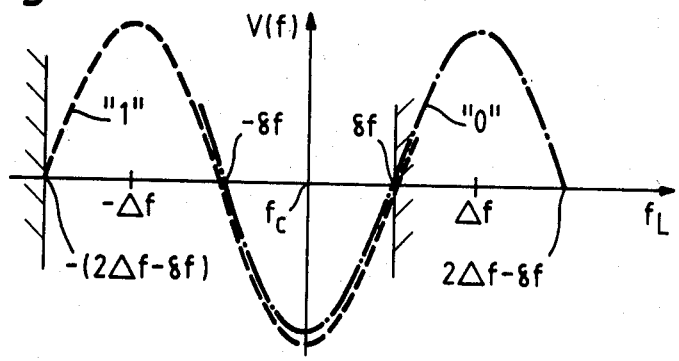
FIG. 6 is a graph showing how the voltage developed at the output of the functional block 40 (FIG. 1) depends on the local oscillator frequency, the local oscillator being tuned by AFC to $-\delta f$.

FIG. 6 shows how the voltage developed at the output of the functional block 40 (FIG. 1) depends on the local oscillator frequency. When each of the two signalling frequencies "1" and "0" are transmitted the theoretical maximum range of mistuning that can be handled by this system is $2\Delta f$; i.e., from $-(2\Delta f - \delta f)$ to $+\delta f$. Even this theoretical range may not be obtainable in practice. Furthermore the range of mistuning may be inadequate for some markets where a deliberate offset of up to 1 kHz is applied, thus leading to a maximum drift specification of ±8 parts per million. The range is limited as shown by the cross hatching because beyond the limits shown for a "1" tone or a "0" tone the sine wave continues and thus, for example, if the "1" tone moves to the right of δf then the feedback voltage will become positive and the effect of this would be to cause the local oscillator frequency to be increased rather than decreased.

Figure 6A:
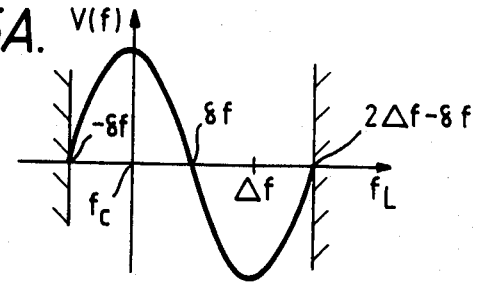
FIG. 6A is a graph, which is the inverse of FIG. 6 in that the local oscillator is tuned by AFC to $+\delta f$.

FIG. 6 illustrates the case where the local oscillator is tuned on −δf. However if the tuning is on +δf then one has the inverse situation as shown in FIG. 6A in which the tuning limits are at −δf and 2Δf−δf.

Figure 8:
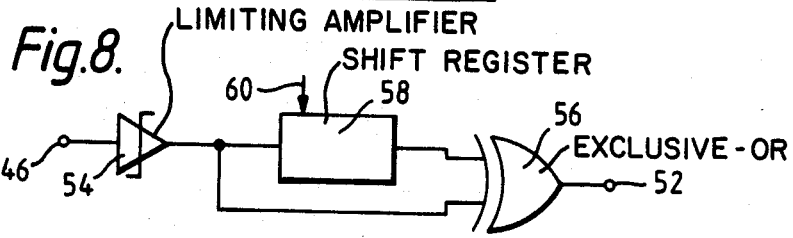
FIG. 8 is a block schematic circuit diagram of another embodiment of the functional block 40 which provides a digital correction of the feedback voltage V(f)

If it is desired to provide a digital feedback loop, then as shown in FIG. 8 the functional block may comprise a limiting amplifier 54 connected to the terminal 46, the output of which is connected to one input of an Exclusive-OR gate 56 and to a digital delay element constituted by an externally clocked shift register 58 having a clock input 60. A charged coupled delay line or an all-pass filter may alternatively be used. The output of the shift register 58 is coupled to another input of the Exclusive-OR gate 56. The output 52 can be connected directly to the low pass filter 44 (FIG. 1) directly without the interposition of an amplifier. In the case of using a clocked delay element 58, case has to be exercised when a harmonic of the input frequency is close to the clock frequency because this can lead to undesirable ripples in the output of the AFC loop, caused by non-coincidence between the zero crossing times of the signal and the clock waveforms. One way of resolving this problem when using a shift register is to increase the number of stages and at the same time increase the clock frequency. However not only will increasing the size of the delay element increase its cost, but also increasing the clock frequency will increase the power consumption of the clock oscillator which is undesirable in a battery powered receiver. Empirical tests have indicated that the minimum size of a shift register should be 8 stages. The selection of the clock frequency is dependent on the amount of delay required. An alternative delay element which will give an improved performance without necessitating a higher clock frequency is to use two interlaced shift registers with polyphase clock signals.

Figure 9:
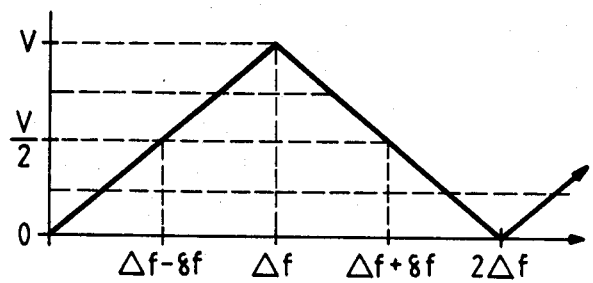
FIG. 9 shows a transfer function of a digital feedback system.
Figure 10:
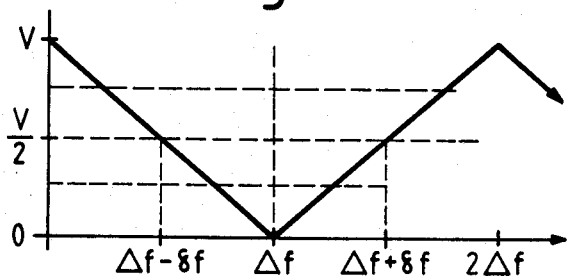
FIG. 10 is an alternative transfer characteristic to that shown in FIG. 9, FIGS. 11 to 15 are waveform diagrams illustrating how the triangular transfer characteristic shown in FIG. 9 is produced.

In a modified feedback system, the transfer characteristic of the AFC loop is substantially of symmetrical triangular form. Such a transfer characteristic is shown in FIG. 9 and the inverse thereof is shown in FIG. 10. If the feedback voltage V(f) is taken to be correct at a value V/2 then this may effectively serve as a reference voltage so that in the case of the tones moving together, the feedback voltage is positive relative to V/2 whereas when the tones move further apart the feedback voltage is negative with respect to a reference constituted by V/2.

A method by which such a triangular characteristic of FIG. 9 can be derived digitally will be described with FIGS. 11 to 15. The feedback circuit will be substantially identical to that described with reference to FIG. 8.

The tone signals Δf+δf and Δf−δf are applied to the limiter circuit 54 which converts them into rectangular waveform signals. The output of the limiter circuit 54 is applied to one input of the two input Exclusive-OR circuit 56 and, via a delay element 58, to a second input of the Exclusive-OR circuit 56.

A low-pass filter or R-C smoothing circuit 44 (FIG. 1) is connected to an output of the Exclusive-OR circuit 56 to produce the control voltage to be applied to the local oscillator 20 (FIG. 1). The time delay $\tau$ applied by the delay element is constant and is related to the frequency of the vertex, Δf, by $\Delta f = 1/(2\tau)$.

FIGS. 11 to 15 illustrate how points on the transfer function can be derived. In each of these Figures the waveform marked A is the input tone signal, the waveform marked B is the input tone signal after being delayed by $\tau$, the waveform marked C is the output of the Exclusive-OR circuit 56 and the waveform marked D is the output of the smoothing circuit 44.

Figure 11:
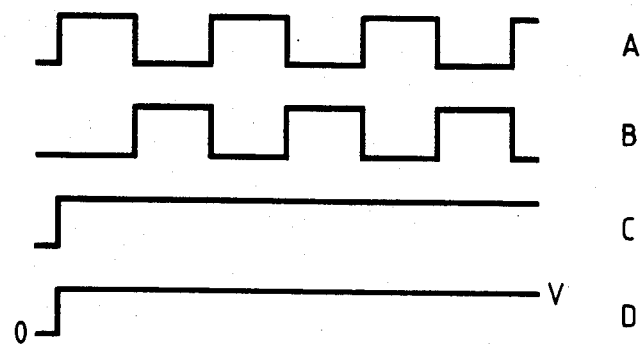

Referring to FIG. 11 the input waveform A has an even mark/space ratio and a half period equal to the time delay $\tau$, that is the frequency of the input waveform A is Δf. Consequently the input and the delayed input signals are opposite in sign or phase to each other so that the output of the Exclusive-OR circuit is permanently binary 1 and thus the control voltage has a maximum value V which is in accordance with the value of the vertex in FIG. C.

Figure 12:
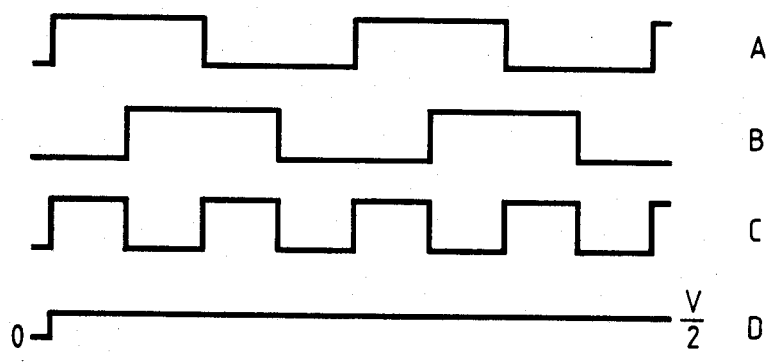

FIG. 12 shows the case for the input frequency being Δf−δf and the delay being a quarter of the period of this tone signal. The output from the Exclusive-OR circuit, waveform C, is a rectangular waveform of even mark/space ratio, which when smoothed produces a control voltage of V/2.

Figure 13:
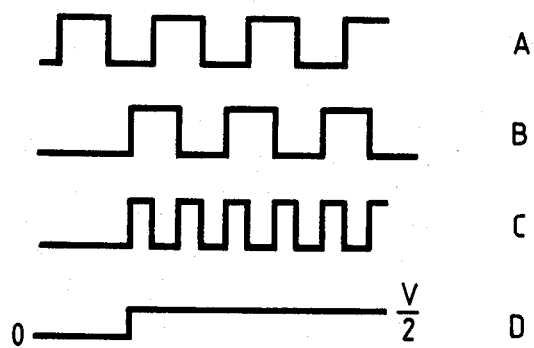

FIG. 13 illustrates the case when the input frequency corresponds to the tone Δf+δf and the delay period $\tau$ is equal to three-quarters of the period of the input signal. Waveform C shows that the output of the Exclusive-OR circuit 56 has an even mark space ratio which when smoothed produces the control voltage V/2.

Figure 14:
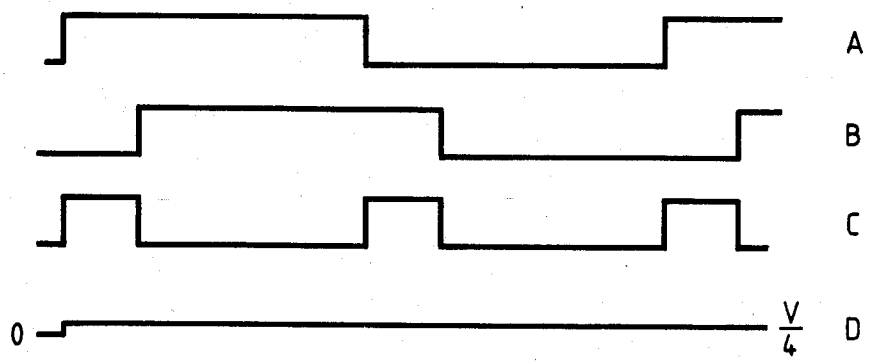

FIG. 14 illustrates the case of the lower tone when the local oscillator has drifted low so that the delay $\tau$ is equal to one-eighth of the period of the input waveform. The mark/space ratio of the output of the Exclusive-OR circuit 56 is 1:3 so that the output of the smoothing circuit 106 is V/4.

Figure 15:
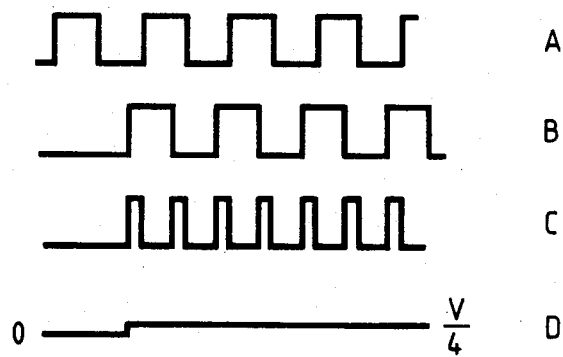

FIG. 15 illustrates the case of the higher tone with a similar local oscillator drift as in FIG. 14. Here the delay $\tau$ equals seven-eighths of the period of the input waveform. The output of the Exclusive-OR circuit 56 has a mark/space ratio of 1:3 so that the output of the smoothing circuit is V/4.

Although the triangular transfer function repeats itself ad infinitum, as far as the practical application of this AFC principle is concerned only the first portion of the transfer function is normally used.

Figure 16:
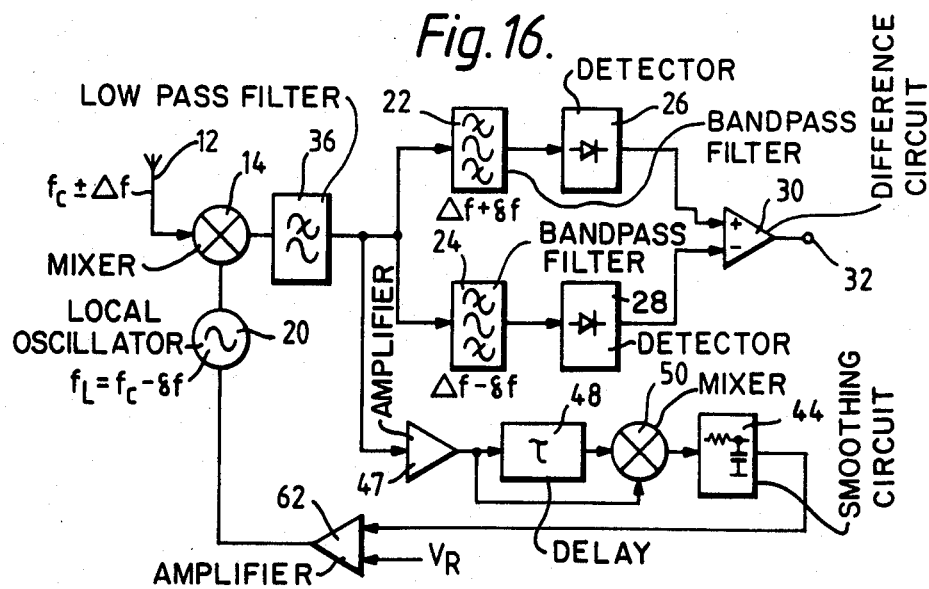
FIG. 16 is a block schematic circuit diagram of an offset receiver having an analogue AFC system.

FIG. 16 illustrates a block schematic diagram of an offset receiver including an analogue AFC system. In the interests of brevity, only the AFC system will be described as the discriminator is as described with reference to FIG. 1.

The AFC system in FIG. 16 comprises a non-inverting amplifier 47 whose input is coupled to the output of the channel filter 36. The gain of the amplifier 47 is such that the signal therefrom has a sufficient level to drive the circuitry which follows it. The output of the amplifier 47 is coupled directly to one input of a mixer 50 and, via a delay or phase shifting element 48, to another input of the mixer 50. The time delay $\tau$ of the phase shifting element 48 is conveniently constant and thus the relative phase difference between the two inputs of the mixer 50 increases directly proportionally with change in frequency. A smoothing circuit 44 is coupled between the output of the mixer 50 and an amplifier 62.

This smoothing circuit 44 may be a simple RC circuit (as shown) or a higher order filter to suit the particular application. The output of the amplifier 62 is coupled to a control input of the local oscillator 20. Frequency control of the local oscillator 20 may be by any suitable method, for example by a varactor diode connected across the crystal.

In order to cope with the situation when no signal is being received, a reference voltage $V_R$ is applied to the amplifier 62 in order to tune the local oscillator 20. Under normal operating conditions there will always be a slight error between the desired frequency and the actual frequency. The amount of error depends on the loop gain of the feedback loop formed by the mixer 14, the amplifier 47, the mixer 50, the amplifier 62 and the local oscillator 20.

In the absence of a signal to provide an AFC voltage, and if the receiver noise is such that the average output voltage is V/2, then the triangular transfer characteristic will provide an average output half way between the vertex and zero. Thus noise in the no signal condition will bias the AFC to the centre of its control range (the optimum point). However D.C. offsets can be put into the system should it be necessary to have the no signal AFC voltage at a different level.

The maximum range of mistuning can be extended by making the assumption that roughly equal numbers of data "1"s and "0"s are being transmitted. Consequently an alternative set of criteria can be used and a more relaxed local oscillator specification catered for. The principle behind the alternative criteria is that when the local oscillator frequency has drifted a long way, in the direction of increasing offset, the upper tone frequency, at $\Delta f + \delta f$, is attenuated in the channel filter 36. At this end of the frequency range, therefore, the AFC system operates on only the lower frequency tone, at $|\Delta f - \delta f|$. The alternative criteria will now be described with reference to FIGS. 17 to 19. To take advantage of the fact that the AFC system operates on only the lower frequency tone, the low frequency, positive region of the transfer characteristic shown in FIG. 5 is in FIG. 17 extended outwards from $f < \Delta f - \delta f$ to $f < f'$ (FIG. 17) thereby extending the tuning range by $f' + \delta f - \Delta f$. However in this new arrangement the lower frequency tone also gives rise to a positive output (instead of zero as in FIG. 5) when the receiver is properly tuned. This is compensated for by increasing the upper limit for the negative region of the feedback voltage V(f) in FIG. 17 relative to that shown in FIG. 5, so that the upper frequency tone gives rise to balancing negative output. This means that the value of V(f) is still negative at $\Delta f + \delta f$ whereas in FIG. 5 it has fallen to zero.

Figure 19:
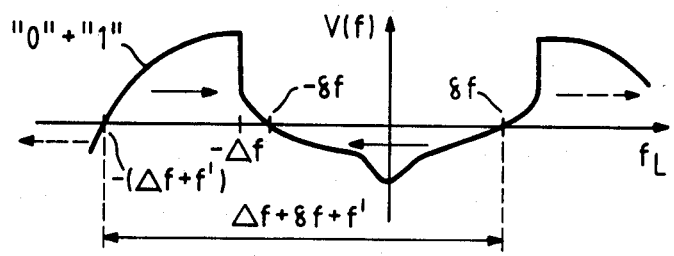
FIG. 19 illustrates the average output obtained from this alternative AFC system.

Taking advantage of the assumption that there is substantially equal numbers of "1"s and "0"s then in order to obtain the correct polarity output, positive for increasing frequency, and negative for decreasing frequency it is the average of the AFC outputs produced by the two tones that now has to be of the correct polarity, this is shown in FIG. 19 of the drawings. The new criteria are as follows, it being assumed that the local oscillator frequency is below the carrier frequency:

| For input $f < f'$ | Output voltage $V(f) > 0$ |
|---|---|
| $f < \Delta f - \delta f$ | $V(f) + V(2\Delta f - f) > 0$ |
| $f = \Delta f - \delta f$ | $V(f) + V(2\Delta f - f) = 0$ |
| $\Delta f - \delta f < f < \Delta f + \delta f$ | $V(f) + V(2\Delta f - f) < 0$ |

As shown in FIG. 19 the new tuning range is $\Delta f + \delta f + f'$ and in consequence $\delta f$ and $f'$ have to be as large as possible, but $f'$ must, however, be kept less than $\Delta f$. The correction of the local oscillator frequency relies upon the sign of the feedback voltage and any attempted corrections outside the range $-(\Delta f + f')$ to $+\delta f$ will adjust to the local oscillator frequency such that correct tuning would be impossible. This is shown in broken line arrows in FIG. 19. By way of example, if $\delta f$ is 3.75 kHz, and $f'$ is 4.2 kHz then an oscillator drift of $\pm 14$ ppm can be tolerated.

Figure 17:
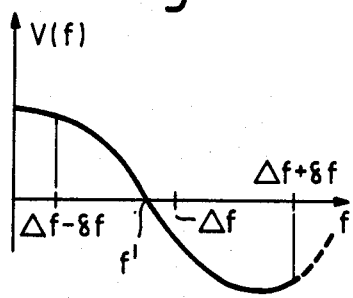
FIGS. 17 and 18 are characteristic diagrams relating to an alternative analogue AFC system to that described with reference to FIGS. 5 and 6.
Figure 18:
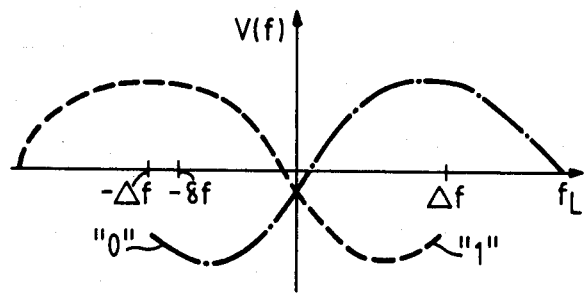
Figure 20:
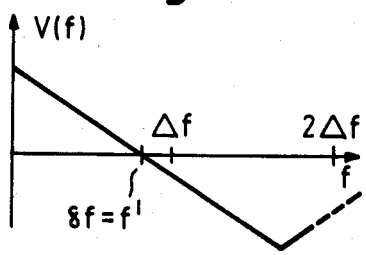
FIGS. 20 to 22 are characteristic diagrams of the digital equivalent to the AFC system shown in FIGS. 17 to 19.
Figure 21:
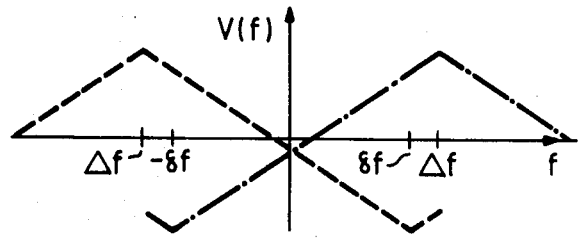
Figure 22:
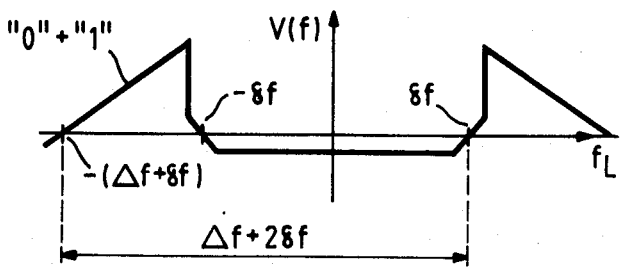

FIGS. 20 to 22 are the various transfer characteristics for the digital equivalent of FIGS. 17 to 19.

In the digital embodiment of FIGS. 20 to 22 it is convenient for paging applications to sacrifice a small amount of tuning range so that some advantages can be obtained. Instead of using a clock frequency of 4.5 kHz, as may be used in obtaining the transfer characteristics of FIGS. 9 and 10, an alternative clock frequency of $4n \times 4$ kHz will enable the new criteria to be met with $f' = \delta f$ which equals 4 kHz. An oscillator drift of 13 ppm can then be tolerated.

The use of the alternative criteria therefore gives an arrangement a greatly increased tuning range for no extra circuit complexity although some slight mistuning may occur if there is an unequal number of "1"s and "0"s.

In many of the embodiments of the invention described above, it has been assumed that the local oscillator frequency increases if a positive AFC voltage is applied. However if one had the case where the local oscillator frequency decreases when a positive AFC voltage is applied, then alternative discriminator transfer functions with the opposite polarity should be used. If an alternative transfer function is used then the receiver tunes to $+\delta f$ (rather than $-\delta f$).

We claim:

1. A direct modulation FM data receiver comprising:
 a mixer having a first input for receiving a directly modulated FM signal having two signalling frequencies $(f_c + \Delta f)$ and $(f_c - \Delta f)$ respectively, a second input, and a mixer output,
 a local oscillator, having a frequency control input, for generating an oscillator output signal having a frequency which is offset from $f_c$ by a predetermined frequency $\delta f$ which is less than $\Delta f$, said oscillator output signal being coupled to said second input so that said mixer output contains signalling tones $\Delta f + \delta f$ and $\Delta f - \delta f$,
 demodulating means having an input coupled to the mixer output, for distinguishing between said tones and deriving an output data signal therefrom corresponding to the respective tones, and
 an AFC feedback path coupling the mixer output to said frequency control input of the local oscillator, for reducing errors in the frequency of the local oscillator output signal, said AFC feedback path having an output voltage versus input frequency characteristic which has non-identical slopes at frequencies of $(\Delta f + \delta f)$ and $(\Delta f - \delta f)$ respectively, said AFC feedback path comprising a sub-circuit having two inputs and an output, for processing signals presented to said two sub-circuit inputs and producing a signal representative of the result,
 said sub-circuit comprising a mixing device for combining signals from said two sub-circuit inputs, and having an output; and a smoothing circuit for coupling from the output of said mixing device to said frequency control input, and said feedback path comprising means for coupling said signalling tones to one of said two sub-circuit inputs, and delay means for coupling from the mixer output to the other of said two inputs, said delay introducing a phase shift of at least $\pi/2$ when said local oscillator frequency is offset from $f_c$ by said predetermined amount.

2. A receiver as claimed in claim 1, characterized in that said delay means includes a shift register, and said mixing device is an exclusive-OR gate.

3. A receiver as claimed in claim 2, characterized in that the slope of said characteristic, as a function of frequency increasing from 0 frequency, first changes sign at a frequency greater than $\Delta f$ but less than $2\Delta f$.

4. A receiver as claimed in claim 2, characterized in that the slope of said characteristic, as a function of frequency increasing from 0 frequency, first changes sign at a frequency greater than $\Delta f$ but less than $2\Delta f$.

5. A receiver as claimed in claim 1, characterized in that said frequency characteristic has equal values at frequencies of $(\Delta f+\delta f)$ and $(\Delta f-\delta f)$ respectively.

6. A receiver as claimed in claim 1, characterized in that said slopes have opposite sign at frequencies of $(\Delta f+\delta f)$ and $(\Delta f-\delta f)$ respectively.

7. A receiver as claimed in claim 6, characterized in that said slopes have equal magnitudes at frequencies of $(\Delta f+\delta f)$ and $(\Delta f-\delta f)$ respectively.

8. A receiver as claimed in claim 7, characterized in that the slope of said characteristic, as a function of frequency increasing from 0 frequency, first changes sign at a frequency $\Delta f$.

9. A receiver as claimed in claim 7, characterized in that the slope of said characteristic, as a function of frequency increasing from 0 frequency, first changes sign at a frequency greater than $\Delta f$ but less than $2\Delta f$.

10. A receiver as claimed in claim 1, characterized in that the slope of said characteristic, as a function of frequency increasing from 0 frequency, first changes sign at a frequency $\Delta f$.

11. A receiver as claimed in claim 1, characterized in that the slope of said characteristic, as a function of frequency increasing from 0 frequency, first changes sign at a frequency greater than $\Delta f$ but less than $2\Delta f$.

12. A direct modulation FM data receiver comprising:
  a mixer having a first input for receiving a directly modulated FM signal having two signalling frequencies $(f_c+\Delta f)$ and $(f_c-\Delta f)$ respectively, a second input, and a mixer output,
  a local oscillator, having a frequency control input, for generating an oscillator output signal having a frequency which is offset from $f_c$ by a predetermined frequency $\delta f$ which is less than $\Delta f$, said oscillator output signal being coupled to said second input so that said mixer output contains signalling tones $\Delta f+\delta f$ and $\Delta f-\delta f$,
  demodulating means having an input coupled to the mixer output, for distinguishing between said tones and deriving an output signal therefrom corresponding to the respective tones, and
  an AFC feedback path coupling the mixer output to said frequency control input of the local oscillator, for reducing errors in the frequency of the local oscillator output signal, said AFC feedback path having an output voltage versus input frequency characteristic which has non-identical slopes at frequencies of $(\Delta f+\delta f)$ and $(\Delta f-\delta f)$ respectively, said AFC feedback path comprising a sub-circuit having two inputs and an output, for effectively multiplying together signals presented to said two sub-circuit inputs and producing a signal representative of the result,
  said sub-circuit comprising a mixer for combining signals from said two sub-circuit inputs, and having an output; and a smoothing circuit for coupling from the output of said mixing device to said frequency control input, and
  said feedback path comprising means for coupling said signalling tones to one of said two inputs, and delay means for coupling from the mixer output to the other of said two inputs, said delay introducing a phase shift of at least $\pi/2$ when said local oscillator frequency is offset from $f_c$ by said predetermined amount.

13. A receiver as claimed in claim 12, characterized in that said frequency characteristic has equal values at frequencies of $(\Delta f+\delta f)$ and $(\Delta f-\delta f)$ respectively.

14. A receiver as claimed in claim 13, characterized in that the slope of said characteristic, as a function of frequency increasing from 0 frequency, first changes sign at a frequency greater than $\Delta f$ but less than $2\Delta f$.

15. A receiver as claimed in claim 12, characterized in that said slopes have opposite sign at frequencies of $(\Delta f+\delta f)$ and $(\Delta f-\delta f)$ respectively.

16. A receiver as claimed in claim 15, characterized in that said slopes have equal magnitudes at frequencies of $(\Delta f+\delta f)$ and $(\Delta f-\delta f)$ respectively.

17. A receiver as claimed in claim 16, characterized in that the slope of said characteristic, as a function of frequency increasing from 0 frequency, first changes sign at a frequency $\Delta f$.

18. A receiver as claimed in claim 16, characterized in that the slope of said characteristic, as a function of frequency increasing from 0 frequency, first changes sign at a frequency greater than $\Delta f$ but less than $2\Delta f$.

19. A receiver as claimed in claim 12, characterized in that the slope of said characteristic, as a function of frequency increasing from 0 frequency, first changes sign at a frequency greater than $\Delta f$ but less than $2\Delta f$.

* * * * *